(12) United States Patent
Geeves

(10) Patent No.: US 11,954,039 B2
(45) Date of Patent: Apr. 9, 2024

(54) CACHING SYSTEM AND METHOD

(71) Applicants: Atlassian Pty Ltd., Sydney (AU); Atlassian Inc., San Francisco, CA (US)

(72) Inventor: Jonathon Patrick Geeves, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/705,149

(22) Filed: Mar. 25, 2022

(65) Prior Publication Data
US 2023/0325322 A1 Oct. 12, 2023

(51) Int. Cl.
G06F 12/08 (2016.01)
G06F 12/084 (2016.01)
G06F 12/0862 (2016.01)
G06F 12/0891 (2016.01)

(52) U.S. Cl.
CPC ........ *G06F 12/0891* (2013.01); *G06F 12/084* (2013.01); *G06F 12/0862* (2013.01)

(58) Field of Classification Search
CPC . G06F 12/0891; G06F 12/084; G06F 12/0862
USPC ........................................................ 711/133
See application file for complete search history.

(56) References Cited

U.S. PATENT DOCUMENTS

| 10,949,352 | B1* | 3/2021 | Kimelman | G06F 12/0842 |
| 2015/0220628 | A1* | 8/2015 | Zhong | G06F 16/9574 707/737 |
| 2018/0368123 | A1* | 12/2018 | Mistry | H04L 67/2876 |
| 2019/0306266 | A1* | 10/2019 | Huang | H04L 67/568 |
| 2021/0193248 | A1* | 6/2021 | Zhang | G11C 29/783 |

* cited by examiner

*Primary Examiner* — Hua J Song
(74) *Attorney, Agent, or Firm* — Brownstein Hyatt Farber Schreck, LLP

(57) ABSTRACT

Methods and computer-readable medium for improved caching are disclosed. The method includes receiving, at a server node, a first data request including an identifier of a requested data entry; performing a lookup in the in-process cache for data corresponding to the identifier; upon determining that data corresponding to the identifier is missing in the in-process cache, invoking a cache loader module configured to: communicate a second data request for the identifier to a shared cache; receive a response from the shared cache; upon determining that data for the identifier was not returned in the response, communicate a third data request for the identifier to a main data store; receive data for the identifier from the main data store; and add the data for the identifier received from the main data store in the in-process cache; and communicating the data for the identifier of the data entry to a requesting system.

18 Claims, 9 Drawing Sheets

CACHING SYSTEM AND METHOD

FIELD

Aspects of the present disclosure are directed to caching, and more particularly to an improved caching system and method.

BACKGROUND

Server systems typically store data in large disk-based relational databases. Constantly retrieving data from these databases can be slow and may increase response time for data requests. Further, computationally intensive applications, such as recommendation engines and high-performance computing simulations, usually access large data sets in real-time across groups of machines/nodes that can span hundreds of computer systems. Due to the speed of the underlying hardware, manipulating this data in a disk-based store is a significant bottleneck for these applications.

SUMMARY

Example embodiments described herein are directed to a computer-implemented method including receiving a first data request at an in-process cache of a server node. The first data request includes an identifier of a requested data entry. The method further includes performing a lookup in the in-process cache for data corresponding to the identifier, and upon determining that data corresponding to the identifier is missing in the in-process cache, invoking a cache loader module. The cache loader module is configured to: communicate a second data request for the identifier to a shared cache; receive a response to the second data request from the shared cache; upon determining that data for the identifier was not returned in the response, communicate a third data request for the identifier to a main data store; receive data for the identifier from the main data store; and add the data for the identifier received from the main data store in the in-process cache. The method further includes communicating the data for the identifier of the data entry to a requesting system.

Some example embodiments are directed to non-transitory computer readable medium that comprises instructions which when executed by a processing unit cause a server node to perform the method described above.

Figure 1:
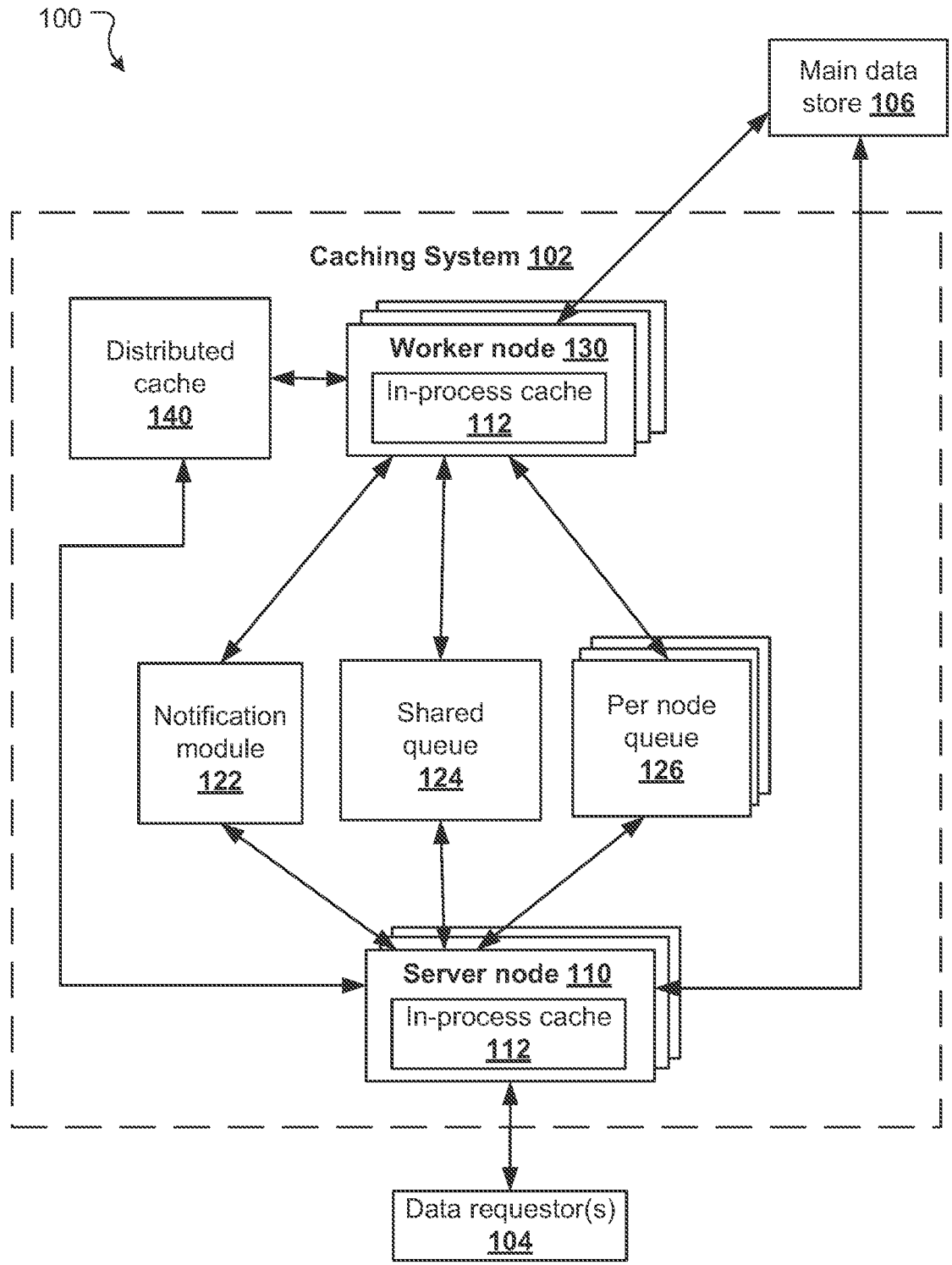
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

In order to address various issues arising from slow access to data stored in large disk-based relational databases, server systems may implement a cache layer, usually employing smaller random access memories that are quicker to access than traditional databases. Typically, a subset of data is transiently stored in a cache to trade off capacity for speed. Accordingly, caching of data may improve response times and data retrieval times by reducing the need to access the underlying disk-based database. A successful cache implementation can result in a high hit rate (where a "hit" means that the requested data is present in the cache). However, in caching, the cached data provided to a client application (or a service) might include stale data (e.g., data that has been updated in the underlying database since it was added to the cache, but has not yet been updated in the cache). This may happen because proper updating processes have not been implemented.

Aspects of the present disclosure provide an improved caching system and method. In particular, aspects of the present disclosure provide a caching system including multiple layers of caches—e.g., an in-process cache layer and a shared cache layer. The in-process cache is stored within a server compute node, has a finite size, and stores hot data (e.g., data that needs to be accessed frequently). The shared cache is shared amongst a plurality of server compute nodes, is larger, and is used to store warm data (data that is accessed less frequently). This allows very low latency lookups for hot data stored in the in-process cache layer and low-latency lookups for warm data stored in the shared cache layer.

When a request for data is received, the presently disclosed systems and methods progressively check each cache layer for any missing data. For example, for a given data request, a server compute node that receives the data request check its own in-process cache first to see if the requested data is available in the in-process cache. If all the requested data is not present in the in-process cache, the server compute node checks in the shared cache for the missing data. If all the missing data is not present in the shared cache, the missing data is retrieved from the main data store. Further, the missing data is added to the in-process cache from the shared cache or the main data store and to the shared cache from the main data store (if required). In this manner, over time, the in-process cache is loaded with hot data.

Further still, the caching systems and methods disclosed herein adopt a number of techniques for refreshing the data stored in the in-process and shared cache. In particular, data in the shared cache is proactively refreshed and the updates made to the shared cache are also propagated to the in-process cache in a timely manner to maintain the accuracy of the data in all the cache layers.

The data caching techniques described herein are suitable for data that is read frequently but updated relatively infrequently, or data that can accept eventual read-after-write consistency of the order of seconds. The techniques may also be useful for applications that have low cardinality data. In one example, the described data caching techniques may be utilized to cache issue metadata and read issue metadata for an issue tracking system that allows users to create and manage "issues" (for example, IT issues, issues related to project management etc.). The issue metadata may include, e.g., for each issue record, an issue type identifier, a status identifier, a project identifier, a priority identifier, etc. Specific examples of such issue tracking systems include the Jira family of products commercially available from Atlassian—for example Jira Software, Jira Service Management (JSM), Jira Work Management, and Jira Align. In another example, the described data caching techniques may be utilized by a permissions management system to cache permissions data and to read permission data from a permissions database. It will be appreciated that these are merely examples and that the presently disclosed caching system can be utilized in conjunction with any other computer product/application to cache underlying data, service data requests, and/or update the caches.

These and other aspects of the present disclosure will be described in detail in the following sections.

Example System

FIG. 1 depicts one example of a networked environment 100 in which the operations and techniques described herein can be performed. The environment 100 includes a caching system 102 between a data requestor 104 and a main data store 106.

Generally speaking, the data requestor 104 communicates data requests to the caching system 102, which either retrieves the requested data from its own caches or from the main data store 106 (if data is not found in its own caches) and communicates the requested data back to the data requestor 104.

The data requestor 104 may be a client device that generates a data request and communicates it to the caching system 102. Alternatively, the data requestor 104 may be another computer application/service, e.g., an issue tracking system or a permissions management system that generates a data request and communicates it to the caching system 102.

In order to respond to data requests from the data requestors 104, the caching system 102 includes a shared cache 140 and one or more server nodes 110.

The shared cache 140, as the name suggests, may be accessed by any of the server nodes 110 of the caching system 102. In one example, the shared cache 140 may be implemented on a single physical computer or hardware component (also referred to as a memory resource hereinafter). In other examples, the shared cache 140 may pool the memory of multiple memory resources into a single in-memory data store or cluster. In the distributed arrangement, the shared cache 140 may expand incrementally by adding more memory resources to the in-memory data store or cluster. In one example, the shared cache 140 may be implemented using Memcached, a distributed memory-caching system. In essence, the shared cache 140 sits between the main data store 106 and the server nodes 110 and at any given time includes at least a subset of the data stored in the main data store 106. In some embodiments, the data is stored in the shared cache 140 as one or more data entries which is a combination of keys and associated values. A non-limiting example of the shared cache 140 includes AWS Elasticache Memcached.

A server node 110 is an instance of a server application and may execute on a computer or hardware resource (as shown and described with reference to FIG. 4). Each server node 110 includes an in-process cache 112. The in-process cache 112 is an object cache that is built within the same computer or hardware resource as its corresponding server node 110. It has a finite size or data storing capacity. In the present disclosure, the in-process cache 112 is configured to store at least a subset of the data stored in the main data store 106 and/or the shared cache 140 temporarily for quick retrieval.

During operation, each active server node 110 is configured to receive data requests from the data requestor 104 and check if the requested data is present in its own in-process cache 112. If the entirety of the data is not found in the in-process cache 112, the server node 110 is configured to check for the missing data in the shared cache 140 or (if all the missing data is not found in the shared cache) then in the main data store 106. Operations and details of the server nodes 110 will be described in detail later.

In addition to fulfilling data requests, the caching system 102 is also configured to update/refresh the in-process cache 112 and shared cache 140 from time to time. Although the server nodes 110 may be able to perform these jobs, it may affect the latency/efficiency of the server nodes 110 to serve the requested data to data requestors 104. To prevent this from happening, the caching system 102 includes one or more worker nodes 130 that can perform these update/refresh jobs in the background while the server nodes 110 respond to data request from data requestors 104.

Worker nodes 130 may be similar to server nodes 110, the major difference being that worker nodes 130 are configured to perform background jobs such as refreshing and updating the caches whereas the server nodes 110 are configured to handle and respond to data requests from data requestors 104 and update their own in-process caches 112. Accordingly, each worker node 130 may also be an instance of a server application and may execute on a computer or hardware resource (as shown and described with reference to FIG. 4) Various components of the worker node 130 are described in detail with reference to FIG. 3.

The server nodes 110 and worker nodes 130 are configured to communicate with each other via one or more communication means such as notification modules or queue. In the example embodiment of FIG. 1, the nodes 110, 130 may communicate with each other via a shared queue 124, a per-node queue 126 and/or a notification module 122.

In some examples, the nodes 110, 130 may utilize the notification module 122 to publish/broadcast messages to other nodes 110, 130. For example, the server nodes 110 or the worker nodes 130 may communicate messages to refresh the in-process cache (112, 132) to the notification module 122. In some examples, the notification module 122 is designed based on a publish-subscribe model. That is, the server or worker nodes send refresh messages to the notification module 122 and consumers (such as the per-node queues 126) subscribe to the notification module 122 to receive refresh messages. In some cases, the notification module 122 may be a dedicated module for the caching system 102. In other examples, the notification module 122 may be utilized by other product applications or programs. In such cases, the server and worker nodes 110, 130 categorize their refresh messages under a 'topic' and the subscribers (e.g., per-node queues 126) express interest in that 'topic'. When the notification module 122 receives a message, it identifies the topic associated with that message and matches the message with the subscribers who subscribed to that topic and makes a copy of the message for each subscriber and pushes a copy to the subscriber's queue. A non-limiting example of a notification module includes the Simple Notification Service (SNS) offered by Amazon.

The shared queue 124 is a message queue that stores messages until they are processed and deleted. Each message in a message queue is generally processed only once, by a single consumer. In the present environment, the shared queue 124 can be accessed by any of the worker nodes 130. The server nodes 110 may post job messages to the shared queue 124 that can be performed by any worker node 130 in the caching system 102. Any free worker node 130 may retrieve a pending job message (in some sort of order maintained by the queue) from the shared queue 124 and execute the job as per the job message. Once the job is executed, the corresponding message is deleted from the queue 124. The job messages that are posted in the shared queue 124 are typically related to refreshing the shared cache 140. A non-limiting example of a shared queue includes the Simple Queue Service (SQS) offered by Amazon.

The per-node queues 126 are also message queues that store messages until they are processed and deleted. However, unlike the shared queue 124, the caching system 102 may include a separate per-node queue 126 for each active server node 110 and worker node 130 in the system 102 and a given per-node queue 126 may only be accessed by its corresponding node. As a new worker or server node is provisioned, a corresponding per-node queue 126 may also be added to the caching system 102. Similarly, if a worker/server node is removed from the caching system 102, the corresponding per-node queue 126 may also be removed. Accordingly, per-node queues 126 are utilized to post jobs that may need to be performed by specific nodes or all nodes in the caching system 102. In one example, the per-node queues 126 subscribe to the notification module 122 to receive refresh messages generated by any one of the server nodes 110 or worker nodes 130. Once a refresh message is received in a per-node queue 126, the corresponding server or worker node 110, 130 retrieves the refresh message from the queue, performs the job as per the refresh message, and causes the refresh message to be deleted.

It will be appreciated that although the caching system 102 is depicted with multiple server nodes 110, worker nodes 130, and per-node queues 126, this need not be the case. In some cases, the caching system 102 may include a single server 110, a worker node 130, and/or a single per-node queue 126. Further still, the caching system 102 can be scalable. That is, the number of server nodes 110 and worker nodes 130 employed in the system 102 may vary over time, e.g., based on demand. During busy times, more server and worker nodes may be provisioned and during low traffic periods some server and/or worker nodes may be decommissioned such that fewer server and worker nodes are executing. In some implementations, the provisioning and decommissioning of the nodes may be done automatically based on predetermined demand patterns, real-time demand, and/or based on any other such network parameters.

While the environment 100 has been provided as an example, alternative system environments/architectures are possible. For example, in some cases, the caching system 102 may not include any worker nodes 130. Instead, the cache refreshing/updating jobs performed by these worker nodes 130 may be performed by the server nodes 110 themselves. Further, in some examples, where the environment 100 includes more than one server node 110, the caching system 102 may further include a load balancer (not shown) that is configured to receive incoming data requests from the data requestor(s) 104 and assign data requests to the server nodes 110 such that the data requests are approximately evenly divided amongst the server nodes 110.

Various components of the networked environment 100 will now be discussed.

As described previously, a server node is an instance of a server application, which may be hosted on one or more hardware components. The server application may provide an endpoint for other server applications or client applications. To do so, the server application may include one or more application programs, libraries, APIs or other software elements that implement the features and functions that are described herein.

In one example, the server application running on the server node 110 may be a data retrieval and storage application that receives and processes data requests to store and/or retrieve data to/from either the caches 112, 140 or the main data store 106. In this example, the data retrieval and storage application may receive such data requests externally from other product applications, and/or in some instances directly from client devices.

In other examples, in addition to being a data retrieval and storage application, the server node 110 may execute an application configured to execute a service or product offered to customers. For instance, the server node 110 may execute an incident management system (e.g., OpsGenie), a software code management system (e.g., Bitbucket), an issue tracking application (e.g., JIRA), or a permission management system. In such cases, the data retrieval and storage application may receive requests to store or retrieve data from the product application also executing within the server node 110.

Figure 2:
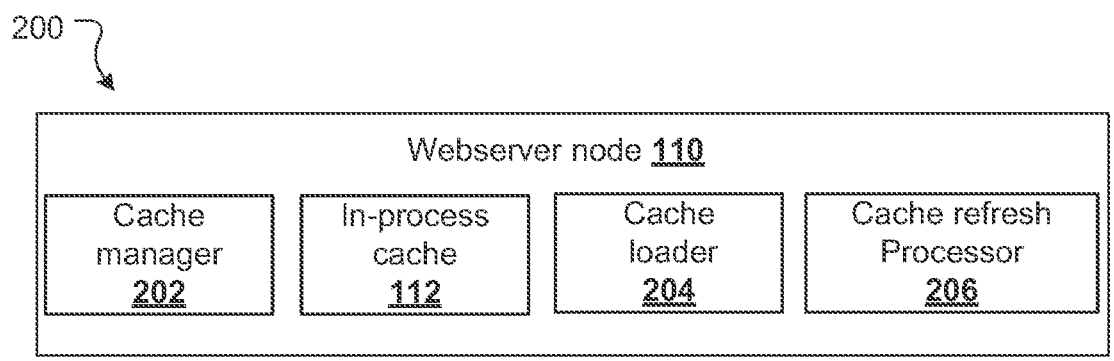
FIG. 2 is a block diagram of an example server node.

FIG. 2 shows a block diagram of a server node 110 running as a data retrieval application. In this example, the server node 110 includes a cache manager 202, an in-process cache 112, a cache loader 204, and a cache refresh processor 206.

The cache manager 202 is configured to receive and service data requests from the data requestors 104, communicate the data requests to the in-process cache 112, and receive requested data from the in-process cache 112. In addition, the cache manager 202 can be configured to initiate updates of the shared and/or in process caches 112. In order to do so, the cache manager 202 is configured to generate update messages or jobs and push these messages or jobs to the notification module 122 and/or the shared queue 124, respectively. The messages may include information related to a cache update job such as a cache refresh job (to refresh data already present in the in-process or shared cache 112, 140), data deletion job (e.g., to evict data present in the in-process or shared caches 112, 140), or data insertion job (e.g., to add data to the in-process or shared caches 112, 140).

As described previously, the in-process cache 112 is an object cache built within the server node 110 and is configured to store data temporarily for quick retrieval. It is also configured to receive data requests from the cache manager 202 and respond to these data requests. The in-process cache 112 may also be configured to initiate the cache loader 204 (as described in more detail below).

Ideally, a cache should have a high hit rate. This can be achieved by storing more data in the cache. However, increasing the size of the cache is often expensive. Accordingly, one way to achieve a high hit rate is to only store data in the in-process cache 112 that is retrieved often and updated infrequently. In order to reach this state and also maintain a predetermined maximum cache size, the in-process cache 112 may employ an eviction policy that decides which data in the cache should be deleted when the total cache size reaches a predetermined threshold size. In one example, the in-process cache 112 may use a least recently used eviction policy that maintains a time based linked list of cache hits. When the maximum number of data entries that can be stored in the cache is reached, the last data entry in the linked list can be evicted first. Alternatively, the cache 112 may use a least frequently used policy that evicts data that was least frequently used when the maximum number of data entries that can be stored in the cache is reached. Meaning that the data that is set to be removed might have been used recently, but wasn't used as often as the rest of the data in the cache. In other cases, the eviction policies may be time-based instead of being size based. That is, data objects may be evicted, e.g., after a period of time (e.g., 120 seconds) has passed since the last read or write occurred on a data entry. Further, a combination of time-based and size-based eviction policies may be utilized. In this way, over time, the in-process cache 112 only maintains data that is either frequently or recently requested and does not store data that is requested infrequently.

The cache loader 204 is configured to receive instructions from the in-process cache 112, and/or cache manager 202 and load data entries into the in-process cache 112 from the shared cache 140 and/or the main data store 106. Further, the cache loader 204 may insert data retrieved from the main data store 106 in the shared cache 140. In some embodiments, the cache loader 204 is configured to refresh (all or specific) data entries in the in-process cache 112, periodically or based on pre-set configuration/scheduling.

The cache refresh processor 206 is configured to update the in-process cache 112. In particular, the cache refresh processor 206 of a server node 110 may be configured to poll its own per-node queue 126 from time to time. If it detects an update message in the per-node queue 126, it may be configured to fetch data based on the update message from the shared cache 140 and add the retrieved data to the in-process cache 112.

As described previously, worker nodes 130 are configured to perform background and/or asynchronous jobs/processes—such as updating and/or refreshing the in-process caches 112 or shared cache 140. In some examples, the worker nodes 130 are created from the same configuration file used to create server nodes 110. In such cases, the worker nodes 130 essentially have the same modules/programs as the server nodes 110. In other examples, worker nodes may be configured differently. For example, a worker node may utilize a different compute instance, meaning that other parameters such as the number of active threshold in a worker node polling the various queues or the size of the in-process cache may vary).

Figure 3:
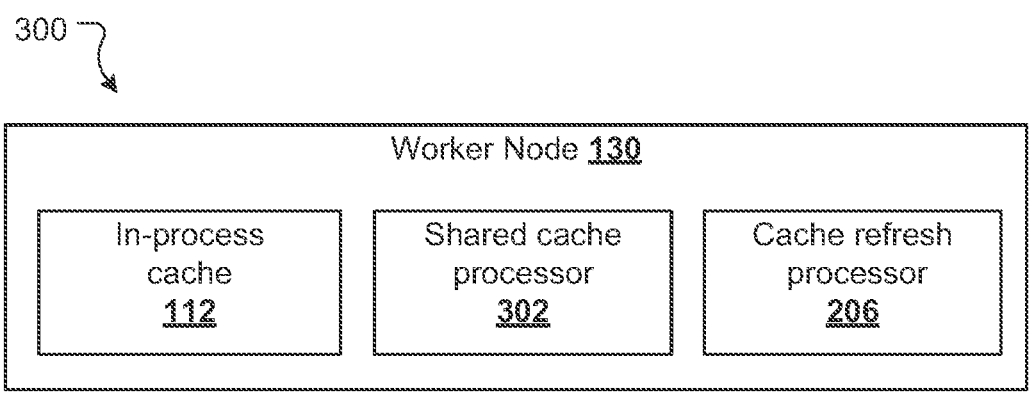
FIG. 3 is a block diagram of an example worker node.

FIG. 3 illustrates an example block diagram 300 of an example worker node 130. The main modules of the worker nodes 130 are described herein. In this example, the main components include an in-process cache 112, a cache refresh processor 206 for refreshing the in-process cache 112 of the worker node 130 and a shared cache processor 302 configured to perform a refresh function on the shared cache 140.

The in-process cache 112 is similar to the in-process cache 112 present in the server nodes 110 and therefore will not be described again. The cache refresh processor 206 is also similar to the cache refresh processor 206 of the server node 110 and is configured to update the in-process cache 112. In particular, the cache refresh processor 206 may be configured to poll its own per-node queue 126 from time to time. If it detects an update message in the per-node queue 126, it may be configured to fetch data based on the update message from the shared cache 140 and add the retrieved data to the in-process cache 112.

The shared cache processor 302 is configured to update the shared cache 140. That is, it is configured to refresh data already present in the shared cache 140 or add new data to the shared cache 140. To this end, the shared cache processor 302 may poll the shared queue 124 periodically (e.g., when it is not already performing a refresh operation). If it detects a refresh message in the shared queue 124, it may be configured to assign the refresh message to itself, determine which data entries in the shared cache 140 needs to be refreshed, fetch the latest values of those data entries from the main data store 106, and replace the old values of those data entries with the latest values of those data entries retrieved from the main data store 106. Once the refresh job is completed, the shared cache processor 302 may mark the refresh message as completed and the message may be deleted from the shared queue 124.

In addition to these modules, the worker nodes 130 may also include a cache manager and/or a cache loader similar to that shown in FIG. 2. However, as these modules of the worker node 130 are not generally utilized in the processes/methods described herein they are not depicted in FIG. 3. Similarly, in some cases, the server nodes may also include a shared cache processor 302. However, as this module is not utilized in the server nodes in the depicted embodiments, it is not depicted in FIG. 2 for ease of understanding.

The techniques and operations described herein are performed by one or more computer processing systems. By way of example, one or more server nodes 110 may be executed on a computer processing system which is configured (or configurable) by hardware and/or software to offer server node functionality. Similarly, one or more worker nodes 130 may be executed on a computer processing system which is configured to offer worker node functionality. Similarly, the other components of the caching system 102, such as the shared cache 140, the notification module 122, the shared queue 124 and/or the per-node queues 126 may be provided by way of a computer processing system.

Figure 4:
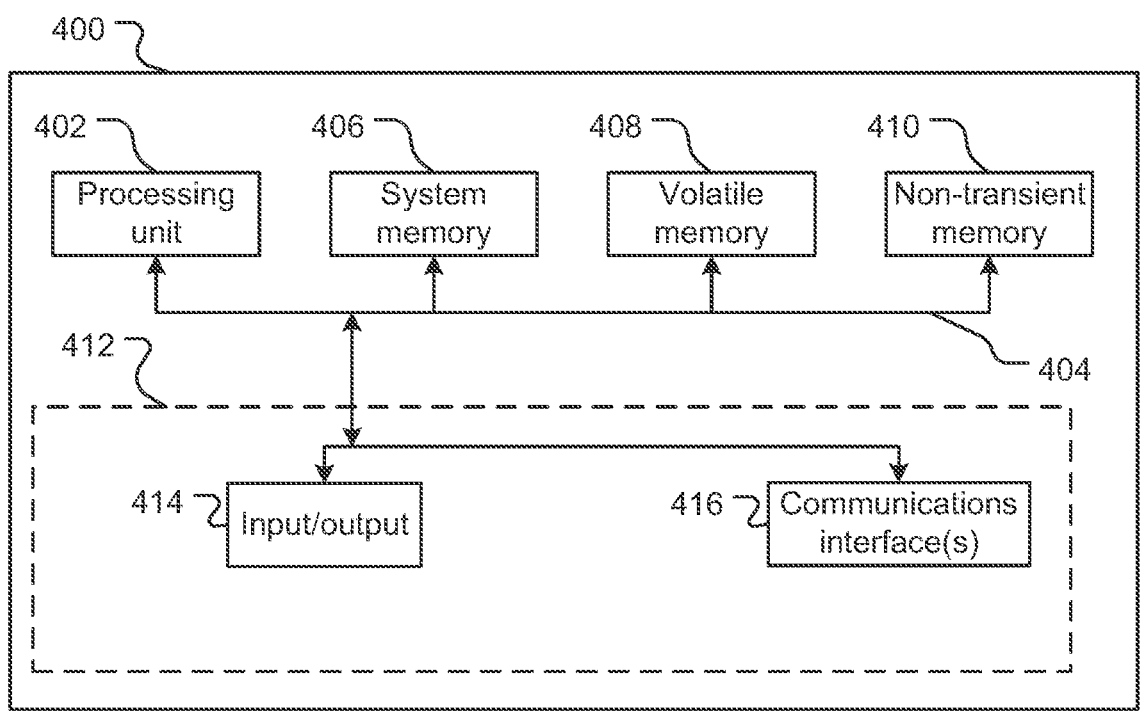
FIG. 4 is a block diagram of a computer processing system configurable to perform various features of the present disclosure.

FIG. 4 provides a block diagram of a computer processing system 400 configurable to implement embodiments and/or features described herein. It will be appreciated that FIG. 4 does not illustrate all functional or physical components of the computer processing system 400. For example, no power supply or power supply interface has been depicted, however the system 400 can either carry a power supply or be configured for connection to a power supply (or both). It will also be appreciated that the particular type of computer processing system can determine the appropriate hardware and architecture, and alternative computer processing systems suitable for implementing features of the present disclosure may have additional, alternative, or fewer components than those depicted.

The computer processing system 400 includes at least one processing unit 402. The processing unit 402 may be a single computer processing device (e.g., a central processing unit, graphics processing unit, or other computational device), or may include a plurality of computer processing devices. In some instances, where a computer processing system 400 is described as performing an operation or function, all processing required to perform that operation or function is performed by the processing unit 402. In other instances, processing required to perform that operation or function may also be performed by remote processing devices accessible to and useable by (either in a shared or dedicated manner) system 400.

Through a communications bus 404 the processing unit 402 is in data communication with a one or more machine readable storage (memory) devices which store computer readable instructions and/or data which are executed by the processing unit 402 to control operation of the computer processing system 400. In this example, the computer processing system 400 includes a main memory which in turn may include a system memory 406 (e.g. a BIOS), a volatile memory 408 (e.g., random access memory such as one or more DRAM modules), and a non-transient memory 410 (e.g., one or more hard disk or solid state drives).

The computer processing system 400 also includes one or more interfaces, indicated generally by 412, via which system 400 interfaces with various devices and/or networks. Generally speaking, other devices may be integral with the computer processing system 400, or may be separate. Where a device is separate from the computer processing system 400, connection between the device and the computer processing system 400 may be via wired or wireless hardware and communication protocols, and may be a direct or an indirect (e.g. networked) connection.

Wired connection with other devices/networks may be by any appropriate standard or proprietary hardware and connectivity protocols. For example, the computer processing system 400 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, the computer processing system 400 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which the computer processing system 400 connects—whether by wired or wireless means—include input/output devices 414 that may include one or more input devices to allow data to be input into/received by the computer processing system 400 and one or more output device to allow data to be output by the computer processing system 400.

The computer processing system 400 also includes one or more communications interfaces 416 for communication with a network (e.g. Internet and/or a local network). Via the communications interface(s) 416, the computer processing system 400 can communicate data to and receive data from networked systems and/or devices.

The computer processing system 400 may be any suitable computer processing system, for example, a server computer system, or a client computer system such as a desktop computer, a laptop computer, a netbook computer, a tablet computing device, a mobile/smart phone, a personal digital assistant, or an alternative computer processing system.

The computer processing system 400 stores or has access to computer applications (also referred to as software or programs)—e.g., computer readable instructions and data which, when executed by the processing unit 402, configure the computer processing system 400 to receive, process, and output data. Instructions and data can be stored on non-transient machine readable medium accessible to the computer processing system 400. Instructions and data may be transmitted to/received by the computer processing system 400 via a data signal in a transmission channel enabled (for example) by a wired or wireless network connection over an interface such as, the communications interface 416.

Typically, one application accessible to the computer processing system 400 is an operating system application. In addition, the computer processing system 400 may store or have access to applications which, when executed by the processing unit 402, configure the computer processing system 400 to perform various computer-implemented processing operations described herein. For example, and referring to the networked environment of FIG. 1 above, the server node 110 includes one or more systems which run the cache manager 202, the cache loader 204, or the cache refresh processor 206.

In some cases part or all of a given computer-implemented method will be performed by the computer processing system 400 itself, while in other cases processing may be performed by other devices in data communication with the computer processing system 400.

Example Methods

Figure 5:
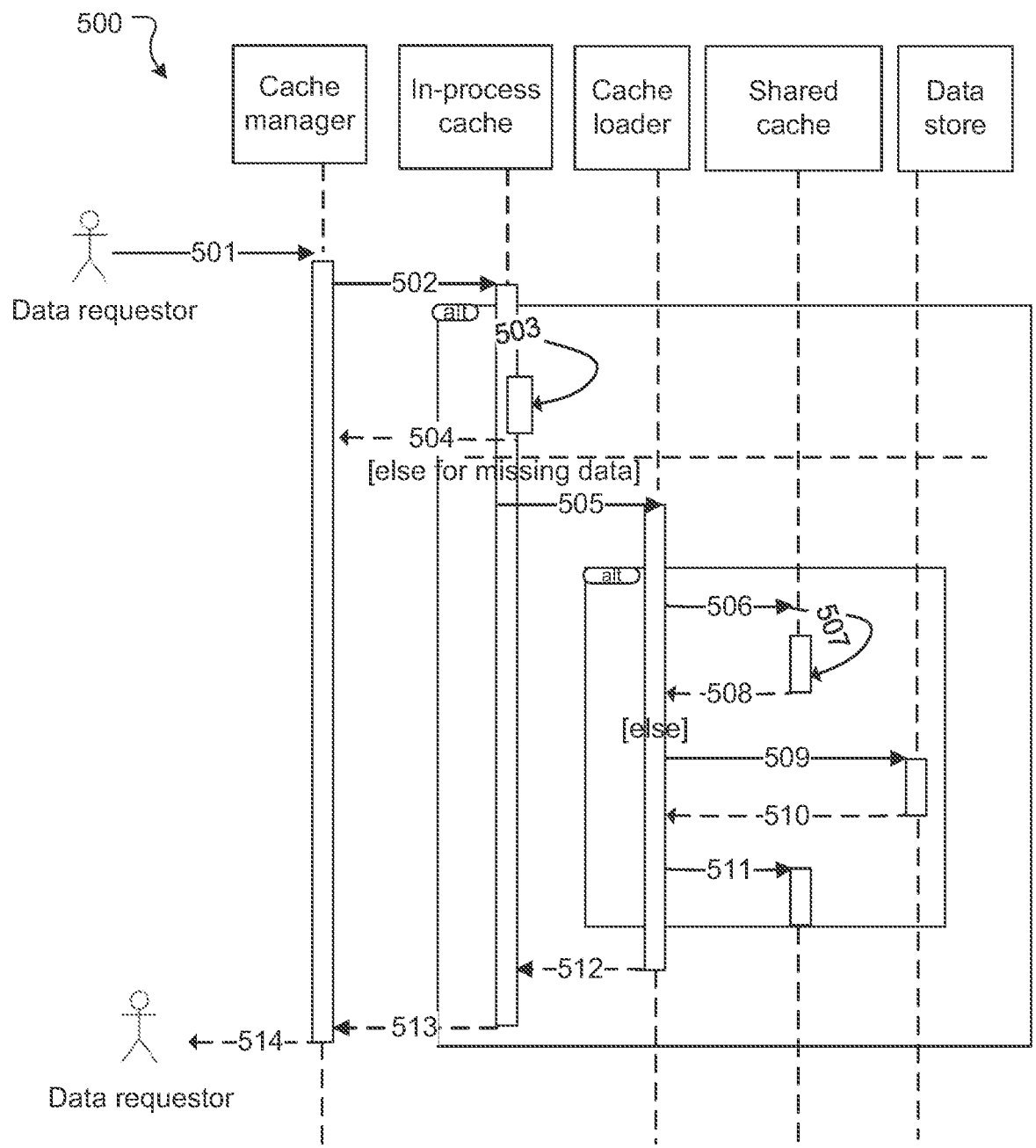
FIG. 5 is a sequence diagram depicting an example method for returning data in response to a data request according to an aspect of the present disclosure.

FIG. 5 is a sequence diagram 500 illustrating the interaction of various components shown in FIGS. 1 and 2 when performing a read operation according to an aspect of the present disclosure.

At step 501, a server node 110 and in particular a cache manager 202 of a server node 110 receives a data request. The data request may include identifiers of the requested data entries. For example, in case the caching system 102 is utilized as part of an issue tracking system, and the data request is for retrieving data associated with 10 issues, the data request may include the unique identifiers of the 10 issues and the corresponding data fields of the issues (e.g., issue title, issue description, issue assignee, etc.) that are required.

At step 502, the cache manager 202 communicates a request for the requested data to the in-process cache 112. In one example the cache manager 202 may simply forward the data request it received at step 1 to the in-process cache 112 at step 502. Alternatively, it may generate its own data request (based on the content of the data request received in step 501) and communicate this newly generated request to the in-process cache 112. In any event, the request includes the identifier(s) of the requested data items.

At step 503, the in-process cache 304 receives the data request and performs a lookup for data identifiers of the data entries present in the data request. If the in-process cache 304 finds the data entries corresponding to the requested data identifiers, it returns the data values corresponding to those data entries to the cache manager 202 at step 504. However, if it is unable to find the data entries corresponding to all the requested data identifiers within its in-process cache 112, it causes the cache loader 204 to be invoked at step 505. Further at this step, the in-process cache 112 communicates the data identifiers of the missing data (i.e., the data that was not found in the in-process cache 112) to the cache loader 204. For example, if data for 3 out of the 10 requested issues was found in the in-process cache 112 at step 503, the in-process cache 112 invokes the cache loader 204 and communicates the issue identifiers of the 7 remaining issues to it.

At step 506, the cache loader 204 communicates a request (including data identifiers of missing data) for the missing data to the shared cache 140. In step 507, the shared cache 140 determines whether the missing data is present in the shared cache 140. To this end, the shared cache 40 performs a lookup of the data identifiers of the missing data in its own memory to check if data entries corresponding to these data identifiers are present in the shared cache 140. If the shared cache 140 finds one or more of the missing data entries, it retrieves the values of the identified missing data entries and communicates it back to the cache loader 204 at step 508.

If the shared cache 140 does not find all the missing data entries it may also communicate a message back to the cache loader 204 at step 508 informing the cache loader 204 of the data entries it could not find.

Next, the cache loader 204 determines if it has received data for all the missing data entries from the shared cache 140. If the cache loader 204 determines that it has received all missing data, the method proceeds to step 512, where the cache loader 204 adds the missing data to the in-process cache 112. For example, if it receives data for all 7 of the issues, the cache loader 204 inserts this data in the in-process cache 112 such that the in-process cache 112 now includes data for all 10 requested issues. The in-process cache 112 can then forward this missing data to the cache manager 202 at step 513.

Alternatively, if the cache loader 204 determines that it has not received data for all the missing data items from the shared cache 140, it generates a data request for the missing data and communicates this request to the main data store 106 at step 509. For example, if out of the 7 issues, the shared cache 140 returns data for 4 issues, the cache loader 204 creates a data request using the identifiers of the 3 remaining issues and communicates this to the main data store 106.

As the main data store 106 includes all the data maintained for a given product application or service, the main data store 106 retrieves the values for the missing data items and returns it to the cache loader 204 at step 510.

At step 511, the cache loader 204 inserts the data retrieved from the data store 106 into the shared cache 140. For example, it may enter the data for the 3 remaining issues received from the main data store 106 into the shared cache 140 such that the shared cache 140 now also has data for all 7 of the missing data item.

In one example, the cache loader 204 performs this step asynchronously. In such cases, the cache loader 204 includes a main compute thread, an in-memory queue, and a set of executor threads. The main compute thread, at step 511, inserts the new data that is to be added to the shared memory 140 in the in-memory queue. Any one of the set of executor threads then retrieves the data and performs the task of adding it to the shared cache 140. The manner in which this data is inserted in the shared cache 140 is described later with reference to FIG. 10.

Then, in step 512, the cache loader 204 adds the missing data to the in-process cache 112. For example, it may enter the data for the 4 issues received from the shared cache 140 and the 3 remaining issues received from the main data store 106 into the in-process cache 112 such that the in-process cache 112 now has data for all 10 issues. The in-process cache 112 returns the data entries received in steps 512 (i.e. data entries from the shared cache 140 and data entries from the main data store 106) to the cache manager 202 at step 513.

The cache manager 202 may create a data response for the data request based on the values of the data items received in step 513 and communicate the data response to the data requestor 104 at step 514.

In this way, the caching system 102 progressively retrieves data from the in-process cache 112, shared cache 140 and main data store 106 if data is not found in the previous layer. Additionally, the caching system 102 inserts the missing data in the previous cache layers so that the cache layers 112, 140 can provide the data quickly to the data requestor 104 the next time this data is requested.

Refreshing In-Process Cache

Figure 6:
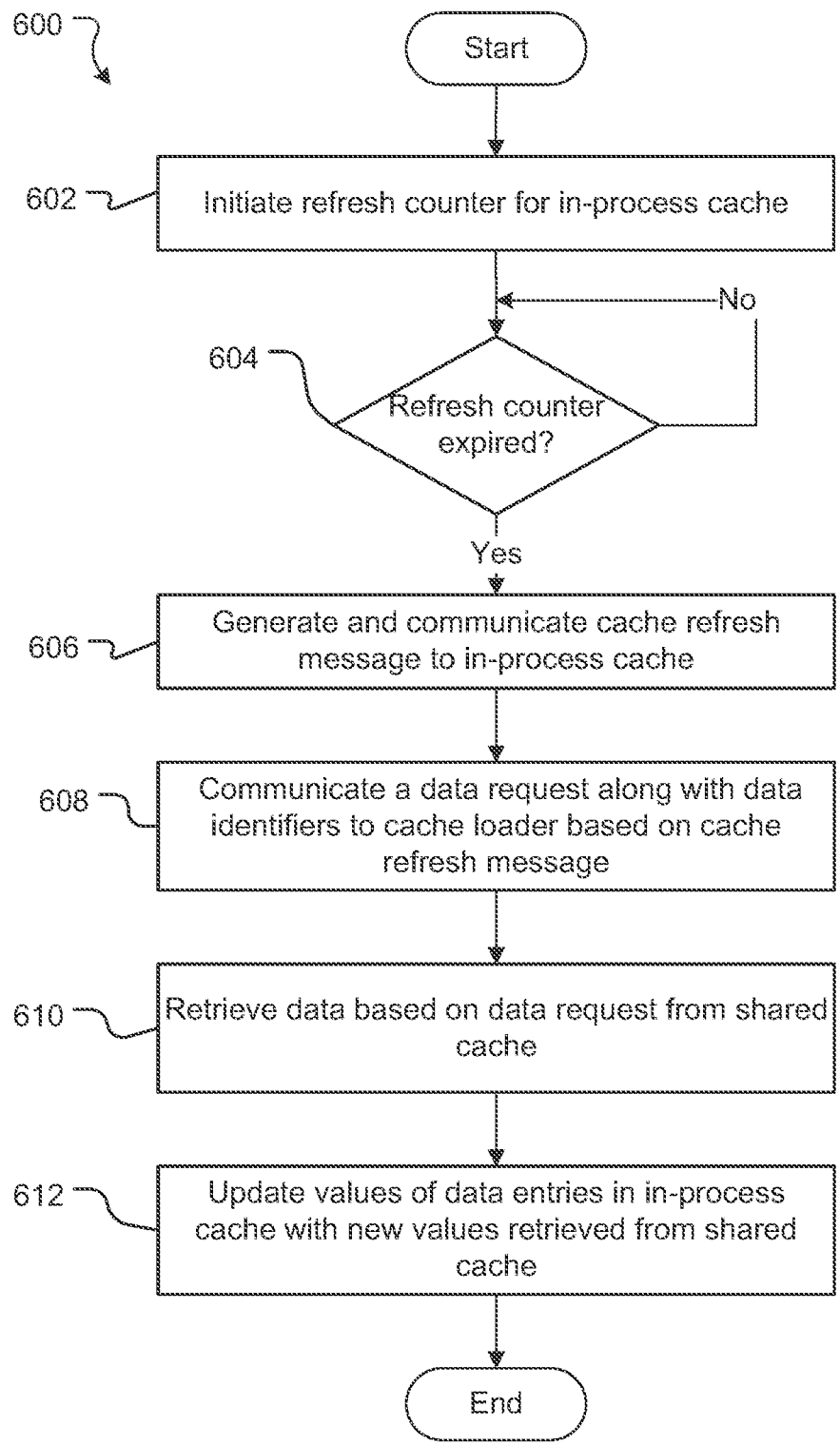
FIG. 6 is a flowchart depicting an example method for refreshing an in-process cache.

Various mechanisms may be employed to update the in-process cache 112. In one example, all the data present in the in-process cache 112 can be periodically refreshed (e.g., every 10 seconds). FIG. 6 shows a flowchart illustrating an example method 600 for updating an in-process cache according to some embodiments of the present disclosure.

The method 600 is performed by a server node 110 to update its own in-process cache. Further, method 600 describes the process of one server node updating its in-process cache 112. It will be appreciated that other active server nodes 110 and worker nodes 130 perform similar methods to update their own in-process caches 112 as well. The method 600 commences at step 602, where the cache manager 202 of a server node 110 initiates a refresh counter for its in-process cache 112. The refresh counter value may be configured based on the given implementation. For instance, if the data within the cache 112 is data that updates rather frequently or if the fidelity of the data is very important, the refresh counter value may be set for a rather small value, e.g., 10 seconds. Alternatively, if the data stored in the in-process cache 112 is data that typically is not updated frequently or if the fidelity of the data is not very important, the refresh counter value may be set for a larger value, e.g., 30 seconds.

Next, at step 604, the cache manager 202 determines whether the refresh counter has expired. If the cache manager 202 determines that the refresh counter has not expired, the method returns to step 604. Alternatively, if a determination is made that the refresh counter has expired, the method proceeds to 606, where the cache manager 202 generates and communicates a refresh message to the in-process cache 112.

Upon receiving the refresh message, the in-process cache 112 invokes the cache loader 204 and communicates a data request to the cache loader 204 at step 608 for refreshing data. In one example, the request includes the data identifiers of the data entries present (at that moment) in the in-process cache 112. In another example, the request may include the data identifiers of data entries that have been requested in a threshold period of time (e.g., in the last minute) and may exclude the data identifiers of data entries that have not been requested in that threshold period.

At step 610, the cache loader 204 receives the data request and retrieves the data for data identifiers present in the data request from the shared cache 140.

At step 612, the cache loader 204 updates the original values of the requested data entries with the new values of those data entries retrieved from the shared cache 140.

Figure 7:
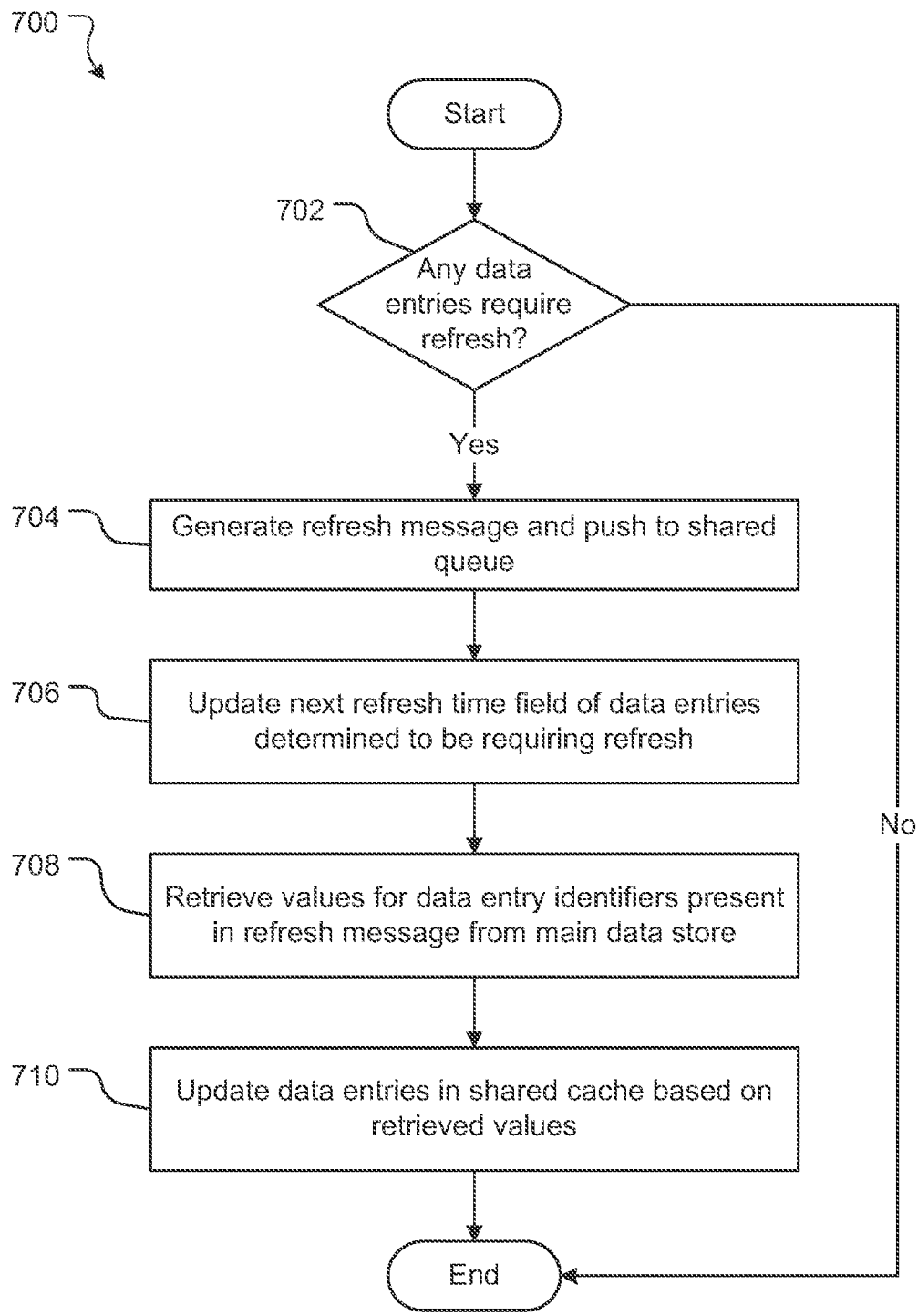
FIG. 7 is a flowchart depicting an example method for refreshing a shared cache according to an aspect of the present disclosure.

Turning now to FIG. 7, an example computer implemented method 700 for refreshing data in the shared cache 140 according to an aspect of the present disclosure will be described. As described previously, the shared cache 140 may store data in the form of data identifiers (or keys) and values. Further, to ensure that the data stored in the cache 140 is not out of data, the shared cache 140 may employ two policies. The first policy may be to evict data that is not requested in a threshold period of time from the cache 140. In certain examples, the shared cache may utilize similar eviction policies to those implemented by in-process caches, however, as the shared cache does not have strict size constraints, it may retain data entries for longer than the in-process cache. For example, it may evict data entries after a longer period of time (e.g., 6 hours, 1 day, 7 days, 30 days, etc.) has passed since the last read or write occurred on a data entry.

The second policy may be to refresh data that is stored in the cache 140. In one example, this second policy may be to refresh data periodically, e.g., every 10 seconds, 30 seconds, or 60 seconds. However, as data is not added to or removed from the cache 140 in periodic intervals, but as and when required, it is difficult to schedule a refresh of the entire cache in a periodic fashion. Further, as the shared cache is relatively large, refreshing the entire cache periodically would be computationally expensive and may create a bottleneck at the main data store. Instead, in another example, the policy may be to refresh data whenever a determination is made that the shared cache 140 includes data that has not been refreshed for a threshold period of time. This may happen in two ways—1. worker nodes 130 may be configured to check if any data in the cache 140 requires refreshing on a regular basis (e.g., every 30 seconds) or 2. whenever the cache loader 204 determines that the shared cache 140 includes data that requires refreshing. The first of these two mechanisms may utilize more computational power and make more data requests to the main data store 106. The second of these two mechanisms may utilize lesser computational power (as only data that is actively being sources from the shared cache 140 is being refreshed) and make fewer data requests to the main data store 106.

In order to allow both of these refresh mechanisms to be employed, for each data entry the shared cache 140 stores the date/time when the data entry in the cache 140 was last updated. It may also store the date/time for the next refresh. For instance, the shared cache 140 may store data as shown below in table A—

TABLE A example records in shared cache

| Key | Data entry | Last updated | Next Refresh Time |
|---|---|---|---|
| 23781263 | Apple | 2022 Feb. 24 12:08:45 | 2022 Feb. 24 18:08:45 |
| 83472984 | Banana | 2022 Feb. 24 12:08:10 | 2022 Feb. 24 18:08:10 |
| 23621399 | Carrot | 2022 Feb. 24 12:07:10 | 2022 Feb. 24 18:07:10 |
| ... | ... | ... | ... |

As shown in table A, for each data entry, the database also includes a last refreshed field and a next refresh time. Whenever the cache loader 204 makes requests for data from the shared cache 120 (e.g., at step 506 or step 608, the shared cache 140 returns the value of the next refresh time along with any data entries found in the cache 140 (at step 508). The cache loader 204 may inspect this next refresh time to determine whether any of the data entries received from the shared cache 140 need to be refreshed. If yes, cache loader 204 may invoke a node (e.g., a worker node) to do so. The flowchart shown in FIG. 7 describes this method.

In one embodiment, the method 700 commences after step 508 of method 500 or after step 610 of method 600. That is, the method commences once the cache loader 204 receives one or more data entries from the shared cache 140 in response to a data request.

At step 702, the cache loader 204 determines whether any of the data entries received from the shared cache 140 require a refresh. To this end, the cache loader 204 may inspect the next refresh time field of each of the received data entries and compare that timestamp value with the current time. If the next refresh time is the current time or in the past, the cache loader 204 may determine that the corresponding data entry needs to be refreshed. Alternatively, if the next refresh time is in the future, the cache loader 204 may determine that the corresponding data entry does not need to be refreshed. If, in one example, the cache loader 204 receives the data entries in table A and the current time is 2022/02/24 18:08:00, it may determine that the next refresh time for two of the entries is in the future and one of the entries is in the past. It may then determine that the third data entry (carrot) needs to be refreshed and the first and second data entries does not need to be refreshed at the current time.

If at step 702, the cache loader 204 determines that none of the received data entries need to be refreshed, method 700 ends. Alternatively, if it determines that one or more of the received data entries need to be refreshed, the method proceeds to step 704 where the cache loader 204 generates a "refresh message". The refresh message includes the identifiers of each of the data entries determined to require a refresh. Once generated, the refresh message is pushed to the shared queue 124.

At 706, the cache loader 204 generates and communicates a request to update the next refresh time field of each data entry it determined that required a refresh at step 702. In one example, the next refresh time of all data entries identified as requiring a refresh can be updated by a predetermined period of time (e.g., 60 seconds, 120 seconds, etc). This way, if the same data entries are requested from the shared cache 140 in the time it takes for a worker node 130 to refresh these data entries, multiple refresh messages are not triggered for the same data entries.

Typically, when the worker nodes 130 are not engaged in a job, they continuously or periodically poll the shared queue 124 to check if any messages are waiting in the queue. In particular, the shared cache processor 302 of the worker nodes 130 poles the shared queue 124. Accordingly, once the refresh message is pushed to the shared queue 124, the shared cache processor 302 of an available worker node 130 polls the shared queue 124 and retrieves the refresh message.

At step 708, once the shared cache processor 302 retrieves the refresh message, it inspects the refresh message to retrieve the data entry identifiers present in the refresh message. The shared cache processor 302 then retrieves values for each of the data entry identifiers from the main data store 106. To do so, it may generate and communicate a data request including the data entry identifiers of data entries requiring refresh to the main data store 106.

Once the shared cache processor 302 has retrieved values for the data entries from the main data store 106, it updates the data entries in the shared cache 140 at step 710. To this end, the shared cache processor 302 may generate and communicate an update message to the shared cache 140. The update message may include the data identifiers of the data entries that need to be refreshed and the new values of these data identifiers retrieved from the main data store 106. The shared cache 140 receives this update message and conditionally updates the original values of the data. The manner in which this data is conditionally updated in the shared cache 140 is described later with reference to FIG. 10. Once the data entries are conditionally updated, the shared cache 140 updates the last refreshed field of the updated data entries to the current date/time.

In this manner, the caching system 102 refreshes data entries that are requested. In some embodiments, data entries that are not requested may be evicted from the shared cache 140 before they need to be refreshed. By refreshing only the data entries that are requested, the caching system 102 reduces the number of data entries that need to be refreshed at any given time and reduces the computational burden on the worker nodes 130.

In addition to these automatic processes to refresh data, other refresh processes may be employed. For example, consider an issue tracking system that handles thousands of issues. If a user makes an update to an issue field, e.g., if a user changes the assignee of an issue, the client typically generates an event record and communicates this event record to an event platform. Different services/products may subscribe to this event platform to receive these event records and perform certain functions based on the records. In one example, a service may be configured to receive data update events from the event platform, and directly trigger a cache refresh for one or more data identifiers based on the data update events. In this case, the method will be similar to that described with reference to FIG. 7, but the process includes a refresh of both the shared cache 140 and the in-process cache 112. The shared cache 140 may be updated first and then the in-process caches 112 of all active server nodes may be refreshed.

Figure 8:
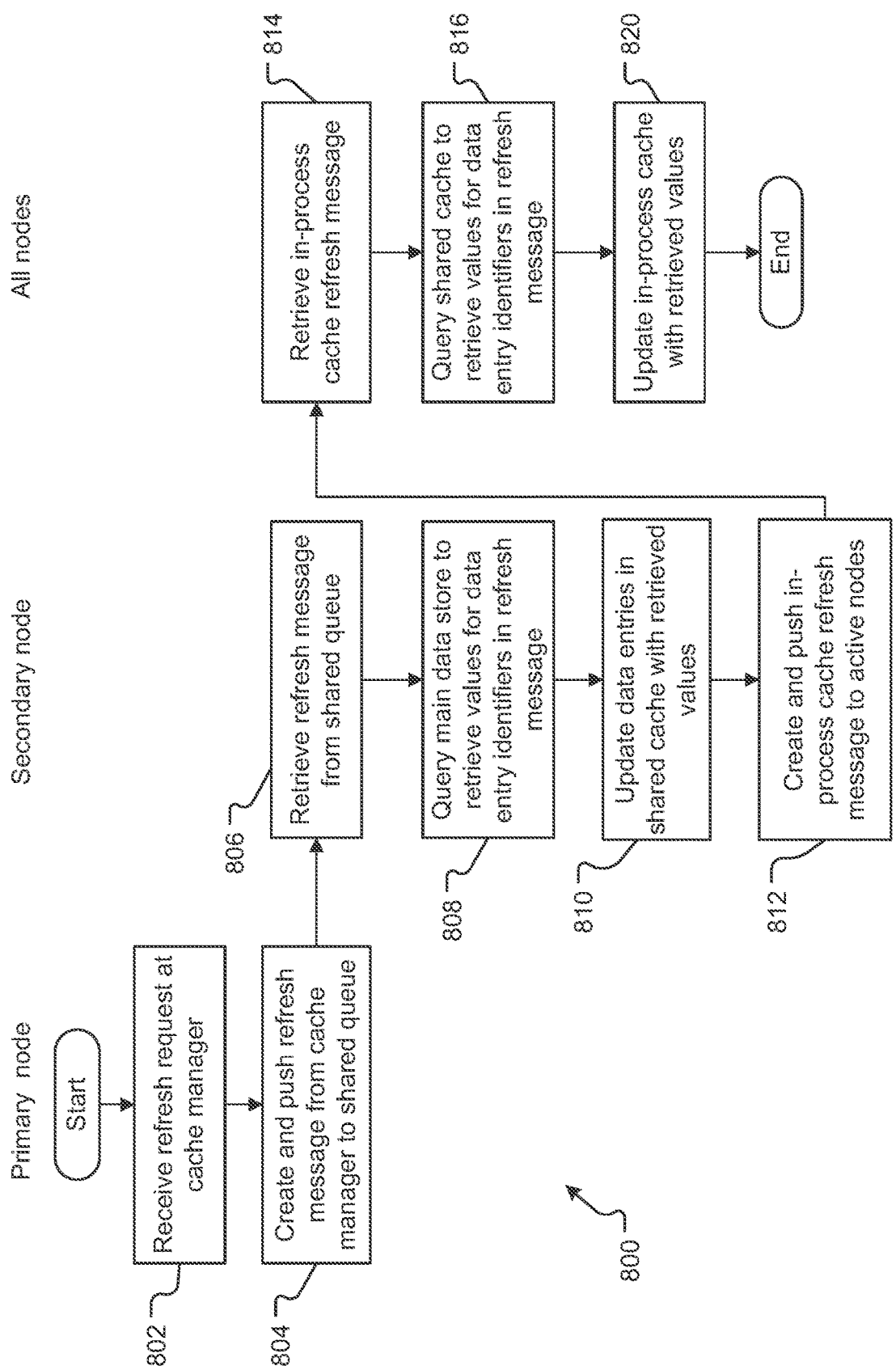
FIG. 8 is a flowchart depicting an example method for refreshing data in one or more caches according to another aspect of the present disclosure.

FIG. 8 is a flowchart depicting an example method 800 for refreshing data in one or more caches based on a trigger received from an external party. The method 800 will be described as being performed by a primary node (e.g. a server node 110) a worker node (e.g. worker node 130), and subsequently by all active nodes (e.g., all server and worker nodes). In alternative embodiments the processing described may be performed by one or more alternative systems/nodes and/or alternative applications running on those systems.

At 802, the cache manager 202 receives a refresh request. The refresh request may be received at an API of the server node 110 and communicated to the cache manager 202. Further, the refresh request may be generated by a third party application, a service, or the application that is executing the caching system 102. In any event, the refresh request includes identifiers of data entries to be refreshed along with the new values of the data entries.

At step 804, the cache manager 202 creates a refresh message based on this refresh request and pushes the refresh message to the shared queue 124. The refresh message may be similar to that created and pushed by the cache loader 204 in step 704 of method 700. However, the refresh message may include some data that helps the worker nodes 130 and especially the shared cache processor 302 to distinguish these refresh messages (triggered by API calls) from the refresh messages (automatically generated by cache loaders). In one example, a message code may be applied to the refresh messages to allow the worker nodes 130 to distinguish between the two types of refresh messages.

At step 806, an available worker node 130 polls the shared queue 124 and retrieves the refresh message. This step is similar to step 708 and therefore is not described in detail again.

Once the shared cache processor 302 retrieves the refresh message, it inspects the refresh message to retrieve the data entry identifiers present in the message. At step 808, the shared cache processor 302 queries the main data store 106 using these data entry identifiers to retrieve new values for these data entry identifiers.

Once the shared cache processor 302 has retrieved new data values for the data entries from the main data store 106, it updates the data entries corresponding to the one or more data identifiers in the shared cache 140 with the new values at step 810 (similar to step 710).

Thereafter, at 812 the shared cache processor 302 creates an in-process cache refresh message and communicates this message to active nodes in the cache system 102. The in-process cache refresh message may include, e.g., the data identifiers of the data entries that were updated in the shared cache at step 808. In one example, the message is communicated to the active nodes via the notification module 122 and the per-node queues 124. As described previously, the per-node queues 126 subscribe to the notification module 122 to receive messages related to refreshing caches. Accordingly, at step 8142, the shared cache processor 302 communicates the in-process cache refresh message to the notification module 122. The notification module 122 in turn pushes the in-process cache refresh message to the per-node queues 126 that subscribed to the notification module 122 rrently active in the caching system 102.

The cache refresh processors 206 poll their corresponding per-node queues 126 continuously. At step 816, the cache refresh processors 206 of the active server nodes 110 retrieve the in-process cache refresh message from their own per-node queues 126 and refresh their in-process caches 112 based on the in-process cache refresh message. For example, the cache refresh processors 206 may fetch data values for the data identifiers present in the in-process cache refresh message from the shared cache 140 at step 816 and update their own in-process caches 112 based on the fetched data values.

Figure 9:
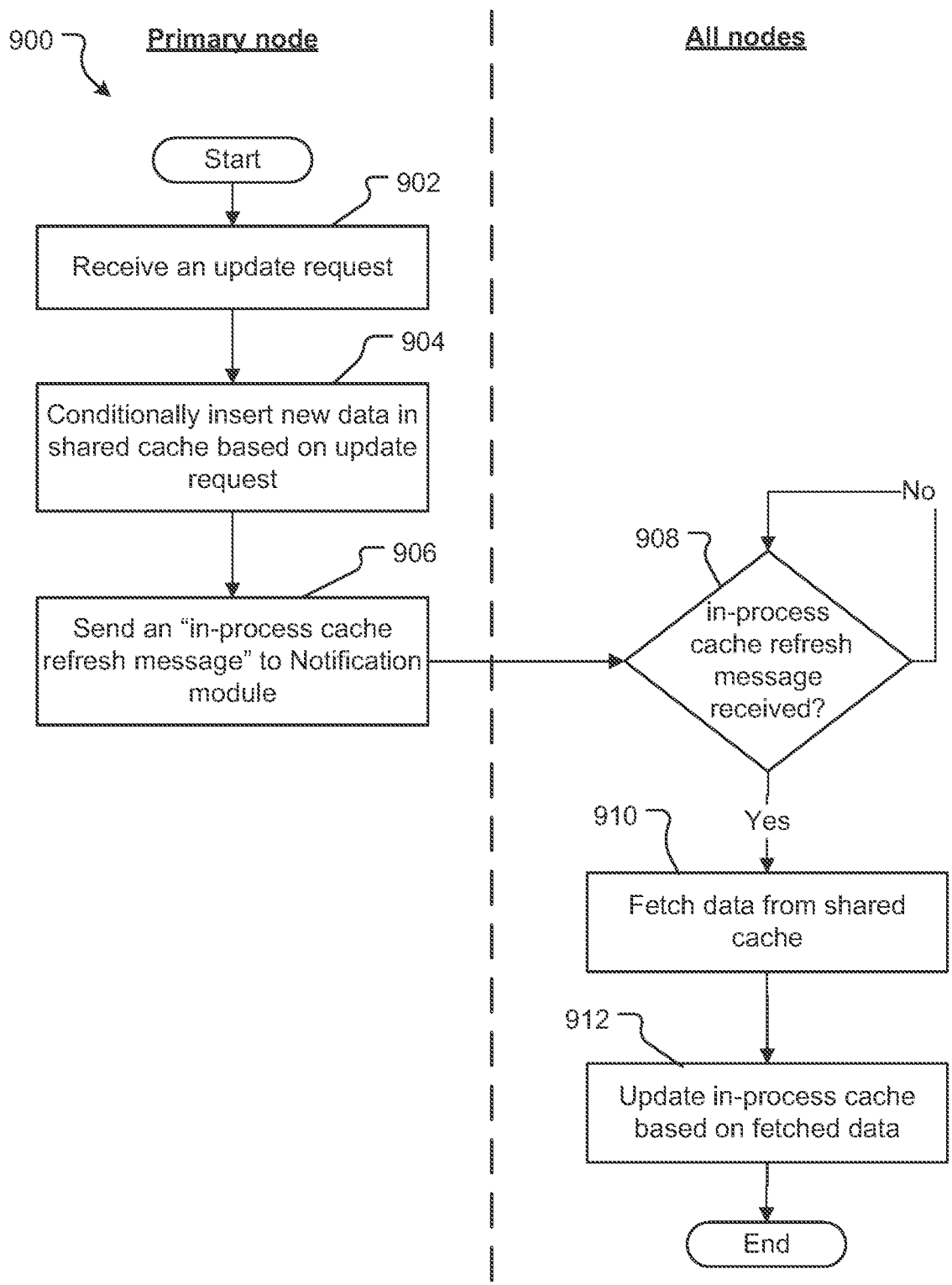
FIG. 9 is a flowchart depicting an example method for updating data in one or more caches according to an aspect of the present disclosure.

Turning now to FIG. 9, an exemplary computer implemented method 900 for actively updating data in the caches without requiring a call-back to the main data store 106 will be described. The method 900 will be described as being performed by a server node and a worker node 130. In alternative embodiments, the processing steps 902-912 as described below may be performed by the server node 110 itself.

At 902, a cache manager (e.g., 202) of a given server node 110 (referred as primary node) receives an update request. The update request may include data that is either already stored in the shared and/or in-process caches 140, 112 or data that is not already stored in any of these caches. In either case, the update request includes not only the data identifiers of the data to be updated but also includes the data values. The update request may be received from the product application that is executing the caching system 102, from a third party application or a service.

At 904, the cache manager 202 conditionally inserts the new data into the shared cache 140. The manner in which this is done is described later.

At 906, the cache manager 202 sends an "in-process cache refresh message" to secondary nodes including other server nodes 110 and worker nodes 130 via the notification module 122 (this is similar to steps 814 described above with reference to FIG. 8 and therefore is not described here again). The "in-process cache refresh message" includes the data identifiers of the data that was conditionally added into the shared cache at step 904. The "in-process cache refresh message" notifies the secondary nodes to refresh the data they have in their in-process caches (e.g. 112) based on the new data inserted in the shared cache 140 at 904.

At step 908, the cache refresh processor 206 in the primary node and each of the active secondary nodes poll their respective per-node queues 126 and read and act upon the received "in-process cache refresh message". That is, the cache refresh processors 206 fetch data from the shared cache 140 (step 910) based on the retrieved refresh message and update their own in-process caches (step 912). This is similar to step 816 of method 800 and therefore is not described in detail again here.

In the various cache refreshing and updating processes described above, it is presumed that the data entries (values and identifiers) present in the refresh/update messages are accurate and up-to-date. However, this may not always be the case. For example, in some cases, an update request (that is meant to add new data in one or more caches) may include data identifiers of data that is already present in the caches. In other examples, a refresh request (that is meant to refresh existing data in the caches) may include data identifiers of data that is not present in the caches. Further, because the refresh and update processes are asynchronous, at any given time, the caching system 102 may include multiple refresh/update messages that include the same data identifiers and a message that was generated at a later time may get processed before a message that was generated before. Accordingly, to take all of these issues into consideration, the databases are "conditionally updated" in the various processes described above—i.e., the databases are updated when certain conditions are met.

Figure 10:
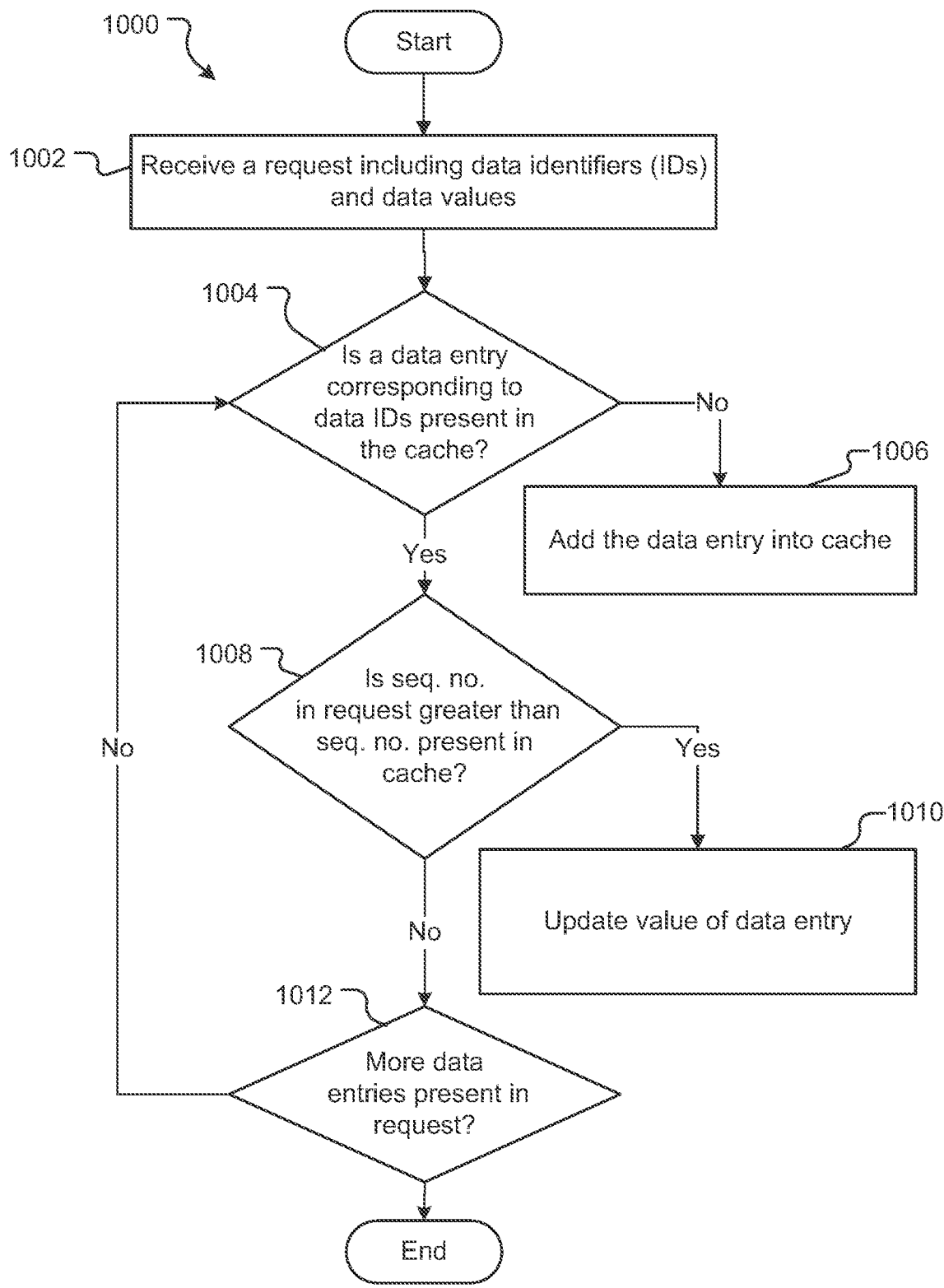
FIG. 10 is a flowchart depicting an example method for conditionally adding data in a cache according to an aspect of the present disclosure.

FIG. 10 illustrates an example method 1000 for conditionally updating a cache according to some aspects of the present disclosure.

The method 1000 commences at step 1002, where a database, e.g., the shared cache 140 or an in-process cache 112 receives a request to update/refresh its data. The request typically includes data identifiers that uniquely identify the data entries and corresponding data values. In addition, to this, the request may also include an "update time field" that indicates the time at which this data entry was updated at the source (e.g., in the main data store 106). The request also includes a sequence number field. In one example, the sequence number field may include a number generated from a monotonically increasing time source or system clock. For example if a data entry was updated in the main data store 106 at 12:10:30 on 24/02/2022, the sequence number field of the data entry may include a value such as 2835. If the same data entry was updated again, 30 seconds later, the sequence number field of the data entry may include a value such as 2836. Generally speaking, each time a data entry is updated in the main data store 106, the sequence number of the data entry is incremented. The same sequence numbers are also maintained by the caches. In one example, the sequence number may include a 128 bit sequence number that is increased each time the corresponding data entry is updated.

At step 1004, if the data update/refresh request includes multiple data entries, the cache checks whether the first data entry in the request is already present in the cache. To this end, the cache compares the data identifier of the data entry with the data identifiers present in the cache. If a match is not found, it determines that the data entry is not already present in the cache. Alternatively, if a match is found, it is determined that the data entry already exists in the cache. If at step 1004 it is determined that the data entry is not present in the cache, the method proceeds to step 1006 where the data entry is added to the cache along with its corresponding data value and last updated time field.

Alternatively, if at step 1004 it is determined that the data entry is already present in the cache, the method proceeds to step 1008 where the cache determines whether the value of data entry present in the data request is newer than the value of the data entry present in the cache. To this end, the cache may compare the sequence number field of the data entry present in the request with the sequence number field of the data entry present in the cache. If the sequence field value of the data entry in the request is higher than the sequence number field value of the data entry in the cache, the cache determines that the data entry present in the data request is newer than the data entry present in the cache. Alternatively, if the sequence number field value of the data entry in the request is lower than the sequence number field value of the data entry in the cache, the cache determines that the data entry present in the data request is older than the data entry present in the cache.

At step 1008, if it is determined that the value of the data entry present in the data request is newer, the method proceeds to step 1010, where the value of the data entry and the sequence number field of the data entry is updated based on the corresponding values received in the data request. Alternatively, if at step 1008, it is determined that the value of the data entry present in the data is the same or older, the method proceeds to step 1012, where the cache is not updated. A check is then made if more data entries are present in the data request. If yes, the method returns to step 1004. Otherwise, method 1000 ends.

This way, the caching system 102 handles concurrency control while writing data to the caches to minimise the chance of stale data being written to the caches or provided to the data requestor.

In the systems and methods described above, per-node queues exist for each active server node 110 and worker node 130 and each per-node queue 126 subscribes to the notification module 122. This per-node queue architecture is used to inform each node in the system to update its in-process cache 112. However, as worker nodes 130 do not receive data requests from data requestors 104 directly, there is no real need for the worker nodes 130 to maintain or update their in-process caches 112. Accordingly, in some examples, the caching system 102 may only include per-node queues 126 for server nodes 110 and not for worker nodes 130. In still other examples, although the system 102 may include per-node queues 126 for all server and worker nodes, the per-node queues 126 for worker nodes may not subscribe to the refresh messages in the notification module 122. In either of these ways, the worker nodes 130 do not get messages to update their in-process caches and consequently do not update their in-process caches. This can free up worker resources to update the shared caches.

Further, as described previously, in some examples, the system 102 may not include any worker nodes 130. Instead, the server nodes 110 may be configured to respond to data requests and also perform cache update/refresh jobs. In such cases, a server node 110 may post a shared cache refresh message to the shared queue 124 and the same server node or another server node that is currently not responding to a data request may retrieve the refresh message from the shared queue 124 and perform method 700.

Further still, in some embodiments, the caches may maintain data in the same format as the main data store 106. In other embodiments, caches may maintain data in different formats to the format used by the main data store. For instance, the main data store 106 may maintain data in tables as data object and corresponding values that may be stored as arrays, trees, or other hierarchical structures. The shared cache 140 on the other hand may store date in the form of an array of bytes. To account for this, the caching system may employ mechanisms for converting data from one format to another. Further, data from the main data store 106 may be serialized or flattened into a string when it is communicated from the main data store to the shared cache or the in-process cache. The cache loader 204 may then deserialize this data and convert it into the format used by the shared cache or the in-process cache before adding the data to the corresponding cache.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method comprising:
   receiving a first data request at an in-process cache of a server node, the first data request including an identifier of a requested data entry;
   performing a lookup in the in-process cache for data corresponding to the identifier;
   upon determining that data corresponding to the identifier is missing in the in-process cache, invoking a cache loader module, the cache loader module configured to:
   communicate a second data request for the identifier to a shared cache;
   receive a response to the second data request from the shared cache;
   upon determining that data for the identifier was not returned in the response, communicate a third data request for the identifier to a main data store;
   receive data for the identifier from the main data store; and
   add the data for the identifier received from the main data store in the in-process cache;
   communicate the data for the identifier of the data entry to a requesting system; and
   in accordance with a determination that the data entry satisfies a refresh criteria;
   update the data entry in the in-process cache;
   generate and push a refresh message to a shared queue; and
   update a next refresh time field of the data entry in the shared cache by a predetermined period of time.

2. The computer-implemented method of claim 1, wherein the cache loader is further configured to add the data for the identifier received from the main data store in the shared cache.

3. The computer-implemented method of claim 1, further comprising:
   refreshing data entries present in the in-process cache at a predetermined frequency.

4. The computer-implemented method of claim 3, wherein refreshing the data entries comprises:
   communicating a fourth data request including identifiers of the data entries present in the in-process cache to the cache loader, the cache loader configured to:
   retrieve data for the identifiers of the data entries present in the in-process cache from the shared cache; and
   update values of the data entries present in the in-process cache based on the data for the identifiers of the data entries present in the in-process cache retrieved from the shared cache.

5. The computer-implemented method of claim 1, further comprising:
   retrieving data for the data entry that requires refresh from the main data store; and
   conditionally updating the corresponding data entry in the shared cache based on the retrieved data.

6. The computer-implemented method of claim 5, wherein conditionally updating the data entry in the shared cache comprises:
   determining whether a sequence number associated with the data entry in the shared cache is smaller than a sequence number associated with the retrieved data from the main data store; and
   upon determining that the sequence number associated with the data entry in the shared cache is smaller than the sequence number associated with the retrieved data from the main data store, updating the corresponding data entry in the shared cache based on the data retrieved from the main data store.

7. The computer-implemented method of claim 1, further comprising:
   receiving an update request at a cache manager of the server node, the update request including a new data entry;
   conditionally inserting the new data entry in the shared cache;
   communicating an in-process cache refresh message to a notification module, the message including an identifier of the new data entry;
   receiving the in-process cache refresh message at a cache processor of the server node;
   fetching, by the cache processor, data corresponding to the identifier of the new data entry from the shared cache; and
   updating the in-process cache based on the fetched data.

8. The computer-implemented method of claim 7, wherein conditionally inserting the new data entry in the shared cache comprises:
- determining whether a data entry corresponding to an identifier of the new data entry exists in the shared cache;
- adding the data entry to the shared cache upon determining that a data entry corresponding to the identifier of the new data entry does not exist in the shared cache.

9. The computer-implemented method of claim 1, further comprising:
- receiving a refresh request at a cache manager of the server node, the refresh request including an identifier of a data entry to be refreshed;
- communicating a refresh message to a shared queue for refreshing the data entry in the shared cache by a worker node;
- retrieving, by a cache processor of the server node, an in-process cache refresh message from a queue associated with the server node, the in-process cache refresh message created by a worker node upon refreshing the data entry in the shared cache, the in-process cache refresh message comprising an identifier of the refreshed data entry;
- fetching, by the cache processor, data corresponding to the identifier of the refreshed data entry from the shared cache; and
- updating the in-process cache based on the fetched data.

10. A non-transitory computer readable medium comprising instructions, which when executed by a processing unit cause a server node to perform operations comprising:
- receiving a first data request at an in-process cache of the server node, the first data request including an identifier of a requested data entry;
- performing a lookup in the in-process cache for data corresponding to the identifier;
- upon determining that data corresponding to the identifier is missing in the in-process cache, invoking a cache loader module, the cache loader module configured to:
  - communicate a second data request for the identifier to a shared cache;
  - receive a response to the second data request from the shared cache;
  - upon determining that data for the identifier was not returned in the response, communicate a third data request for the identifier to a main data store;
  - receive data for the identifier from the main data store; and
  - add the data for the identifier received from the main data store in the in-process cache; and
- communicating the data for the identifier of the data entry to a requesting system; and
- in accordance with a determination that the data entry satisfies a refresh criteria;
  - update the data in the in-process cache;
  - generate and push a refresh message to a shared queue; and
  - update a next refresh time field of the data entry in the shared cache by a predetermined period of time.

11. The non-transitory computer readable medium of claim 10, wherein the cache loader is further configured to add the data for the identifier received from the main data store in the shared cache.

12. The non-transitory computer readable medium of claim 10, further comprising instructions which when executed by the processor cause the server node to perform the operations comprising:
- refreshing data entries present in the in-process cache at a predetermined frequency.

13. The non-transitory computer readable medium of claim 12, wherein refreshing the data entries comprises:
- communicating a fourth data request including identifiers of the data entries present in the in-process cache to the cache loader, the cache loader configured to:
  - retrieve data for the identifiers of the data entries present in the in-process cache from the shared cache; and
  - update values of the data entries present in the in-process cache based on the data for the identifiers of the data entries present in the in-process cache retrieved from the shared cache.

14. The non-transitory computer readable medium of claim 10, further comprising instructions which when executed by the processor cause the server node to perform the operations comprising:
- retrieving data for the data entry that requires refresh from the main data store; and
- conditionally updating the corresponding data entry in the shared cache based on the retrieved data.

15. The non-transitory computer readable medium of claim 14, wherein conditionally updating the data entry in the shared cache comprises:
- determining whether a sequence number associated with the data entry in the shared cache is smaller than a sequence number associated with the retrieved data from the main data store; and
- upon determining that the sequence number associated with the data entry in the shared cache is smaller than the sequence number associated with the retrieved data from the main data store, updating the corresponding data entry in the shared cache based on the data retrieved from the main data store.

16. The non-transitory computer readable medium of claim 10, further comprising instructions which when executed by the processor cause the server node to perform the operations comprising:
- receiving an update request at a cache manager of the server node, the update request including a new data entry;
- conditionally inserting the new data entry in the shared cache;
- communicating an in-process cache refresh message to a notification module, the message including an identifier of the new data entry;
- receiving the in-process cache refresh message at a cache processor of the server node;
- fetching, by the cache processor, data corresponding to the identifier of the new data entry from the shared cache; and
- updating the in-process cache based on the fetched data.

17. The non-transitory computer readable medium of claim 16, wherein conditionally inserting the new data entry in the shared cache comprises:
- determining whether a data entry corresponding to an identifier of the new data entry exists in the shared cache; and
- adding the data entry to the shared cache upon determining that a data entry corresponding to the identifier of the new data entry does not exist in the shared cache.

18. The non-transitory computer readable medium of claim 10, further comprising instructions which when executed by the processor cause the server node to perform the operations comprising:
- receiving a refresh request at a cache manager of the server node, the refresh request including an identifier of a data entry to be refreshed;
- communicating a refresh message to a shared queue for refreshing the data entry in the shared cache by a worker node;
- retrieving, by a cache processor of the server node, an in-process cache refresh message from a queue associated with the server node, the in-process cache refresh message created by a worker node upon refreshing the data entry in the shared cache, the in-process cache refresh message comprising an identifier of the refreshed data entry;
- fetching, by the cache processor, data corresponding to the identifier of the refreshed data entry from the shared cache; and
- updating the in-process cache based on the fetched data.

* * * * *